United States Patent
Hill et al.

(10) Patent No.: US 6,638,468 B1
(45) Date of Patent: Oct. 28, 2003

(54) METHOD OF REDUCING THE WALL THICKNESS OF A PTFE TUBE

(75) Inventors: Jason P. Hill, Brooklyn Park, MN (US); James R. Lininger, New Hope, MN (US); Brian J. Brown, Hanover, MN (US)

(73) Assignee: SciMed Life Systems, Inc., Maple Grove, MN (US)

( * ) Notice: Subject to any disclaimer, the term of this patent is extended or adjusted under 35 U.S.C. 154(b) by 310 days.

(21) Appl. No.: 09/748,417

(22) Filed: Dec. 26, 2000

(51) Int. Cl.$^7$ .................. B29B 11/10; B29B 11/12; B29C 43/08; B29C 47/88; B29C 55/22
(52) U.S. Cl. .................. 264/291; 264/209.1; 264/210.1; 264/211.12; 264/211.2; 264/234; 264/288.4; 264/345; 264/635
(58) Field of Search .................. 264/635, 291, 264/209.1, 210.1, 211.12, 211.2, 234, 345, 288.4; 425/328, 329, 335, 363

(56) References Cited

U.S. PATENT DOCUMENTS

| | | |
|---|---|---|
| 2,994,933 A | 8/1961 | Wolfe |
| 3,225,129 A | 12/1965 | Taylor et al. |
| 4,060,577 A | 11/1977 | Collins |
| 4,225,547 A | 9/1980 | Okita |
| 4,530,811 A * | 7/1985 | Jakobsen et al. .......... 264/521 |
| 4,613,474 A | 9/1986 | Donati |
| 5,207,960 A | 5/1993 | Moret de Rocheprise |
| 5,346,502 A * | 9/1994 | Estabrook et al. .......... 606/169 |
| 5,466,509 A | 11/1995 | Kowligi et al. |
| 5,843,173 A | 12/1998 | Shannon et al. |

FOREIGN PATENT DOCUMENTS

| | | |
|---|---|---|
| DE | 25 36 358 A1 | 2/1976 |
| DE | 43 36 175 C1 | 10/1994 |
| GB | 1148243 | 4/1969 |

* cited by examiner

*Primary Examiner*—Stephen J. Lechert, Jr.
(74) *Attorney, Agent, or Firm*—Hoffman & Baron, LLP

(57) ABSTRACT

A thin wall PTFE tube is formed from an extruded green tube. The PTFE tube includes an inner tubular surface and an opposed outer tubular surface defining a tubular wall of a first thickness. The tubular wall is compressed to uniformly reduce the wall-thickness and circumferentially orient the tube. The PTFE tube is positioned over a first elongate roller with the inner tubular surface being in contact therewith. A second roller is positioned against the outer tubular surface of the PTFE tube. The pair of rollers are counter rotated so as to circumferentially compress the tubular wall between the rollers. This results in the uniform reduction in the tubular wall from the first thickness to a lesser second thickness and a circumferential orientation otherwise not occurring in an extruded PTFE paste extrusion.

11 Claims, 4 Drawing Sheets

METHOD OF REDUCING THE WALL
THICKNESS OF A PTFE TUBE

FIELD OF THE INVENTION

The present invention relates generally to PTFE tubes, preferably ePTFE tubes for use as luminal prostheses. More particularly, the present invention relates to a method of forming a PTFE tube having a reduced wall thickness and larger diameter.

BACKGROUND OF THE INVENTION

The use of products formed from polytetrafluoroethylene (PTFE) tubes in medical applications is well known. Products such as implantable grafts, covered stents, catheter tubing and the like may be formed from tubes of PTFE. One technique for forming PTFE tubing is to use a wet flow paste extrusion process. The paste extrusion process yields a green tube which is then subjected to secondary operations such as heating, expansion and sintering to yield a porous expanded PTFE (ePTFE) tube having a porous node and fibril structure which optimizes its use in medical applications.

Often, the green tube produced by the paste extrusion process has a relatively thick wall and a small internal diameter. The secondary operations of expanding the tube and subsequently sintering the tube results in a certain degree of thinning of the wall of the tube. However, the expansion process currently being used limits the amount of thinning or circumferential orientation that can be achieved in the wall thickness of the tube. In certain applications, the resultant ePTFE tube may still exhibit a sufficiently large wall thickness making it difficult to use in certain medical applications. Additionally, extrusion process results in the extruded tube being highly oriented in a single (longitudinal) direction. Thus the tube would exhibit reduced strength in the transverse or circumferential direction. The secondary operations do little to improve the circumferential strength of the tube.

In instances where an extruded ePTFE tube is being used to form an implantable luminal prosthesis, the thickness and circumferential strength of the tube are of particular concern. For example, a relatively thick tube may be more difficult to implant, especially where the prosthesis is designed for endoluminal delivery. Furthermore, in situations which require multiple layer prostheses, such as with a graft formed by a tube-over-tube construction, or where the ePTFE tube is being used to form a stent/graft composite structure having a stent employed in combination with one or more graft layers, the wall thickness of the ePTFE tube is of particular concern. With grafts formed of multiple layered tubes, the porosity of the graft may be affected by the thickness of the structure. In stent/graft composite structures, the thickness of the ePTFE tube may render the delivery and deployment of the composite structure difficult. Moreover, circumferential strength is required both during implantation as well as in use. The prosthesis must be capable of withstanding expansion upon deployment and must also withstand the internal pressure of blood flow in use.

It is, therefore, desirable to provide a method and apparatus for forming a PTFE green tube of reduced wall thickness that imparts a degree of circumferential orientation to a PTFE green tube.

SUMMARY OF THE INVENTION

It is an object of the present invention to provide a process for reducing the wall thickness of a PTFE tube and circumferentially orientating the nodal structure It is a further object of the present invention to provide a process for increasing the circumferential strength of the PTFE tube by circumferentially orienting and thinning the wall, while simultaneously increasing the diameter of the tube.

It is a still further object of the present invention to provide a thin wall PTFE tube formed from an extruded tube where the wall thickness of the extruded tube has been reduced and circumferentially oriented.

In the efficient attainment of these and other objects, the present invention provides a method for forming a circumferentially oriented thin wall PTFE tube. The PTFE tube includes an inner tubular surface and an opposed outer tubular surface defining a tubular wall of a first thickness. The PTFE tube is positioned over a first elongate roller with the inner surface of the tube being in contact therewith. A second surface is positioned against the outer tubular surface of the PTFE tube. The first surface is rotated relative to the second surface to compress the tubular wall between the surfaces thereby uniformly reducing the tubular wall from the first thickness to a lesser second thickness and providing circumferential orientation to the tube.

As more particularly described by way of preferred embodiments, a second roller defining the second surface is brought into contact therewith so as to effect compression of the tubular wall therebetween. Counter-rotation of the first and second rollers may be achieved by rotating the first roller which is maintained in contact with the second roller. The present invention further provides for secondary tensioning rollers which are positioned with the inner surface of the tube. The secondary tensioning rollers maintain a tensioning bias against the inner surface of the tube. These rollers serve to take up the slack created from the diameter enlargement and thinning process to prevent the tubular walls from being pinched between the first and second rollers.

Another aspect of the invention provides for placing the tube over a first elongate luminal roller, the outer rolling surface contacting the inner tubular surface. The assembled configuration is then placed within a larger, substantially hollow cylindrical elongate roller. A tensioning bias is applied to the first roller, thereby squeezing the tubular material between the outer rolling surface of the luminal roller and the interior circumferential surface of the hollow roller. A rotational force is then applied to the first roller, causing rotation of the first roller and PTFE tube mounted thereon providing for thinning of the PTFE tube.

Another embodiment of the invention provides for placing the tube on an elongate roller and utilizing a smooth surface as the second surface. Additionally, it is contemplated to utilize two opposing rolling surfaces positioned substantially parallel on opposing sides of the tube and roller assembly.

Preferably, the process of the present invention is achieved in a warm water bath and the PTFE tube includes a lubricant to facilitate processing.

DETAILED DESCRIPTION OF PREFERRED EMBODIMENTS

The present invention provides a method and apparatus for reducing or thinning the wall and imparting circumferential orientation of a tubular member preferably an extruded PTFE green tube. Furthermore, the present invention provides a product formed by such a method and apparatus where the PTFE green tube has a thinned tubular wall which may be subject to secondary operations such as expansion and sintering to yield an extremely thin-wall biaxially oriented ePTFE.

Figure 1:
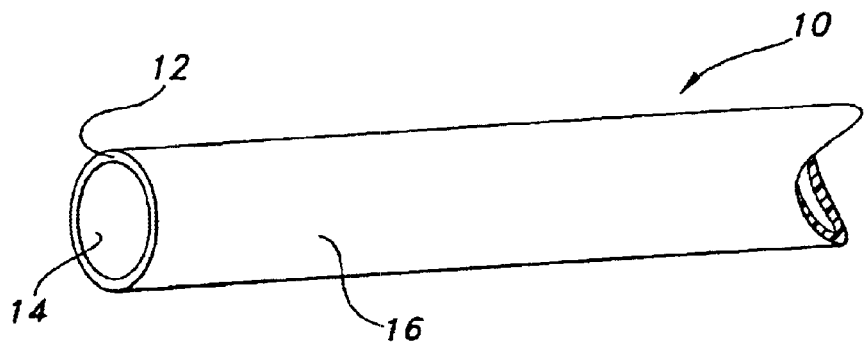
FIG. 1 is a perspective showing of a PTFE green tube used in accordance with the present invention.

Referring to FIG. 1, an extent of a PTFE green tube 10 is shown. Green tube 10 is an elongate tubular member having a generally cylindrical tubular wall 12 defining an inner luminal surface 14 and an opposed outer luminal surface 16. Green tube 10 may be formed in a conventional wet flow paste extrusion process which is well known in the art. In such a process, a PTFE paste of resin and lubricant is formed in a pre-form press into a tubular pre-form product referred to as a tubular billet. The tubular billet is loaded into an extruder and is positioned for entry into a die apparatus. The die apparatus typically includes a die cavity with an elongate cylindrical mandrel centered therein. The billet is extruded through the die apparatus yielding a generally tubular PTFE green tube. The green tube yielded by such a process contains a certain amount of a low volatility lubricant therein, which as will be described hereinbelow facilitates the operation of the present invention.

As is well known in the art, the green tube is then subjected to secondary operations such as expansion and sintering to yield an expanded polytetrafluoroethylene (ePTFE) tube. Such ePTFE tube has a thinner wall thickness as a result of the secondary operations and also exhibits a desired porous node and fibril structure which facilitates its use as an implantable medical prosthesis. While the resultant ePTFE tube, which has been subjected to such expansion and sintering, has a thinner wall thickness as a result of these operations, the reduction in the wall thickness of the ePTFE tube is limited by the wall thickness of the originally extruded green tube. The present invention provides for the thinning of the extruded green tube prior to subjecting it to such secondary operations in order to yield a resultant ePTFE tube having a thinner wall thickness and biaxial orientation.

Figure 2:
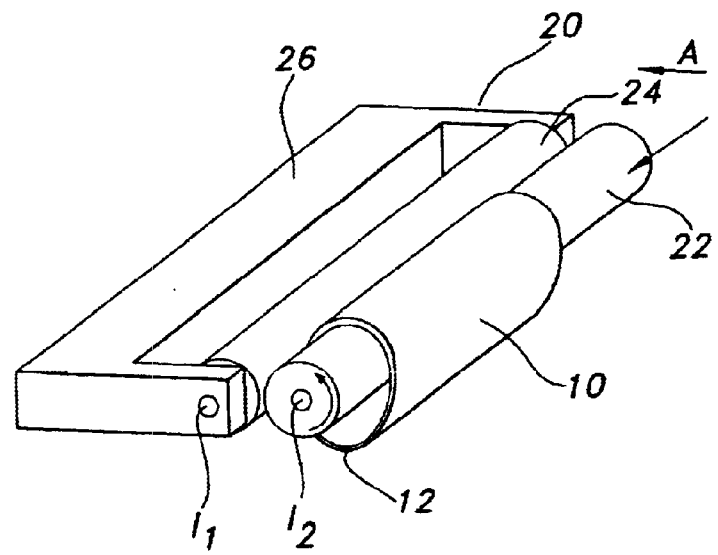
FIG. 2 is a perspective showing of an apparatus used to thin the wall of the PTFE green tube of FIG. 1.
Figure 3:
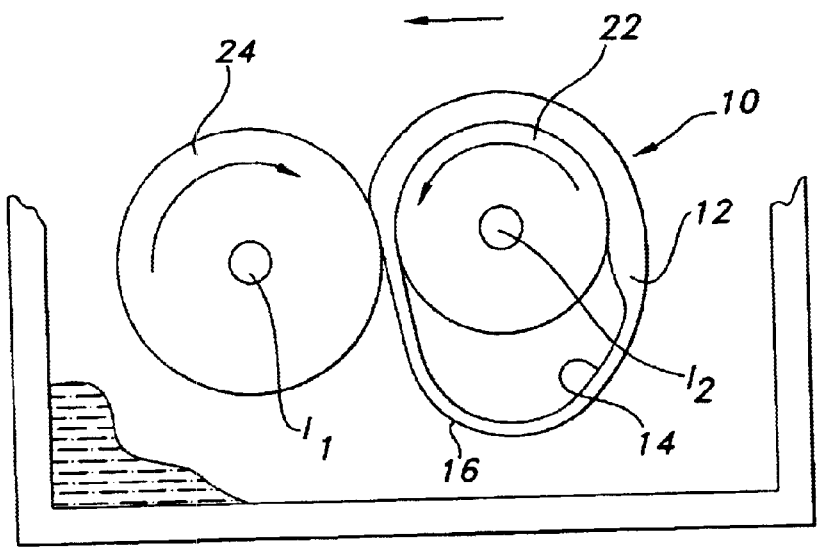
FIG. 3 is an end view of the rollers of the apparatus shown in FIG. 2.

Referring now to FIGS. 2 and 3, a roller apparatus 20 for thinning the tubular wall 12 of PTFE green tube 10 is shown. The roller apparatus 20 includes a pair of elongate mandrels or rollers 22 and 24 supported for mutual relative movement towards and away from one another. In the present illustrative embodiment, roller 24 is a stationary roller mounted to a mounting device 26. Roller 22 is a movable roller which is movable in a direction of arrow A towards roller 24. Each of rollers 22 and 24 are supported in a manner which permits independent is rotation of the rollers about their longitudinal axes $1_1$, $1_2$.

In order to thin the PTFE green tube 10, the green tube is positioned concentrically over movable roller 22 so that the outer surface of movable roller 22 contacts the inner surface 14 of green tube 10. Movable roller 22 is then moved in the direction of arrow A towards stationary roller 24 to place the outer surface 16 of green tube 10 into contact therewith. Such movement is achieved so as to compress the PTFE green tube 10 between rollers 22 and 24.

As particularly shown in FIG. 3, rollers 22 and 24 are caused to counter rotate. Such counter rotation may be achieved by rotating one of the rollers 22 and 24 in a first rotational direction. Inasmuch as frictional engagement is maintained between the movable roller 22 and the stationary roller 24 though green tube 10, rotation of one of the rollers in one rotational direction will effect counter rotation of the other roller. While direct rotation of only one roller is preferred, it is within the contemplation of the present invention to directly rotate both rollers in a counter rotative manner.

Upon the counter rotation of rollers 22 and 24, the green tube 10 supported about movable roller 22 will be compressed. The tubular wall 12 will be circumiferentially thinned as it is passed between two rotating rollers. Such thinning of the tubular wall 12 will cause a corresponding increase the inner diameter of green tube 10. As compressive pressure is maintained between the two rollers, continued rotation of the green tube therebetween will cause an increasing reduction in the wall thickness, as well as an increase in tube diameter. The rolling of the green tube between the rollers is maintained for such a time as is required to achieve the desired reduction in wall thickness. The circumferential movement of the green tube between rollers 22 and 24 is facilitated by the above-mentioned inclusion of a suitable lubricant, such as isopar in the green tube paste. The lubricant also assists in preventing longitudinal cracking of the tube.

In order to maintain a smooth uniform configuration of the resultant thinned green tube, the rollers 22 and 24 are preferably formed of stainless steel having been machined to eliminate any surface imperfections. However, it is further contemplated that one or more of the rollers may be formed of a harder material such as carbide, which resists any distortion during use yielding a more uniform tubular surface.

It is further contemplated that in order to operate more efficiently, the roller apparatus 20 may be operated in a heated water bath in order to more effectively thin the green tube. It is contemplated that such bath may be a heated solvent bath having a temperature of between 20° C. and 140° C.

Figure 6:
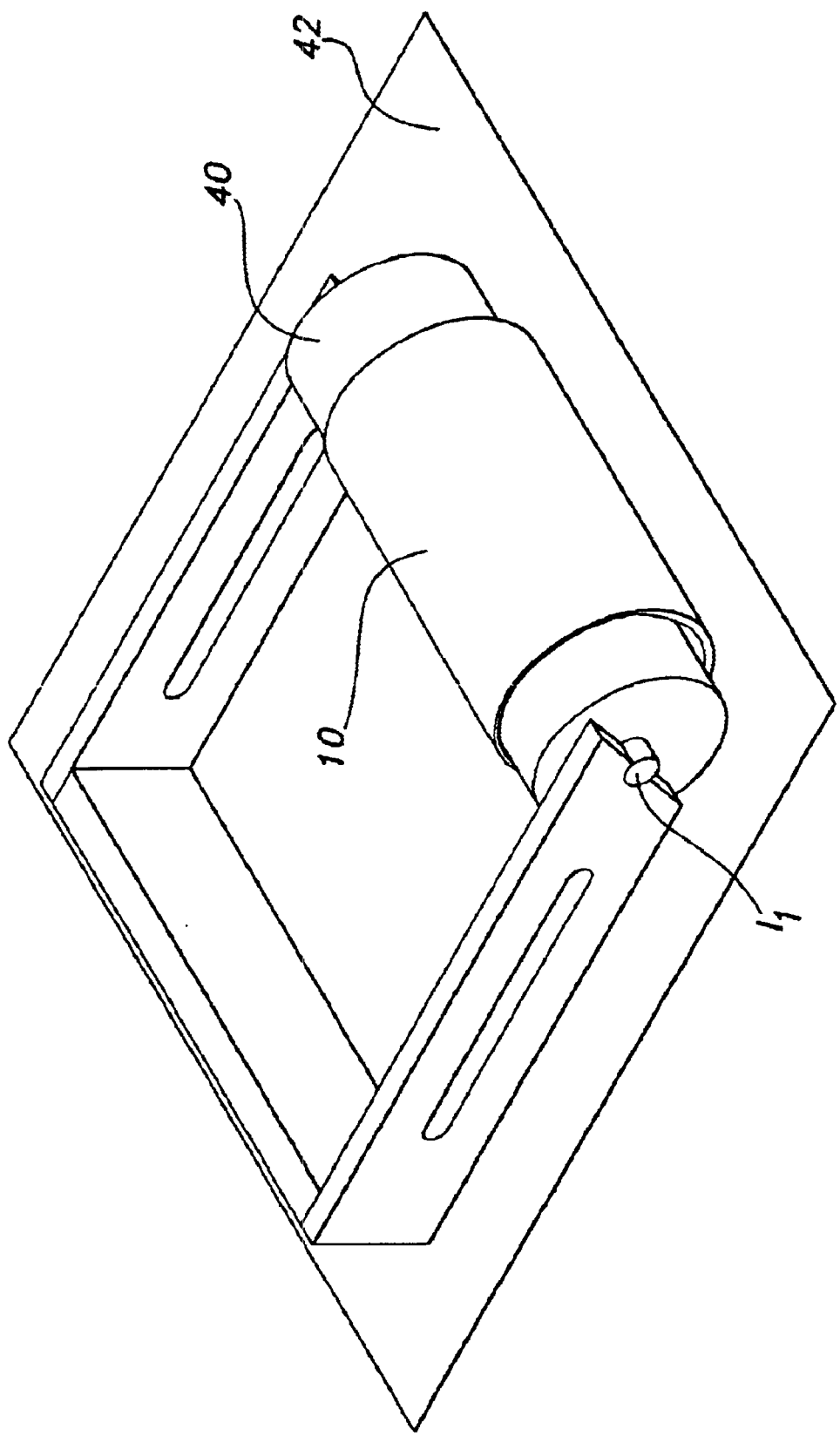
FIG. 6 is a schematic of a still further embodiment of the method and apparatus of the present invention utilizing a first roller and a substantially flat rolling surface.

In an embodiment shown in FIG. 6, a roller 40 similar to that shown in FIG. 2 is used to compress the tube 10 against a smooth surface 42. It is contemplated that surface 42 could be a flat surface that is fixably positioned or movably positioned. The rotational movement of the tube 10 can be accomplished through forcible rotation of roller 40 about axis $1_1$ or a sliding movement of surface 42 in directions perpendicular to axis $1_1$ providing for passive rotation of cylinder 40 about axis $1_1$. The compressive force and frictional engagement will cause the relative movement of one the roller 40 and Surface 42. Both forcible rotation and sliding movements could be provided simultaneously. Such relative movement effects the desired thinning and circumferential orienting of the tube 10.

The resultant green tube yields a thin wall ePTFE tube which has improved radial tear strength and creep resistance.

Furthermore, by wet cold rolling the green tube at a temperature lower than the melt temperature or softening temperature of the PTFE, the tube becomes easier to handle thereby increasing the yield during the subsequent expansion and sintering thereof.

Figure 4:
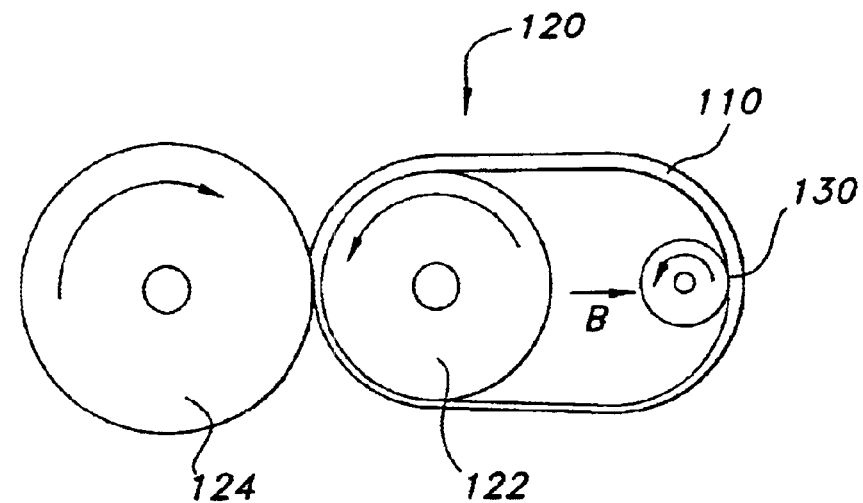
FIG. 4 is a schematic representation of one embodiment of the method and apparatus of the present invention.
Figure 5:
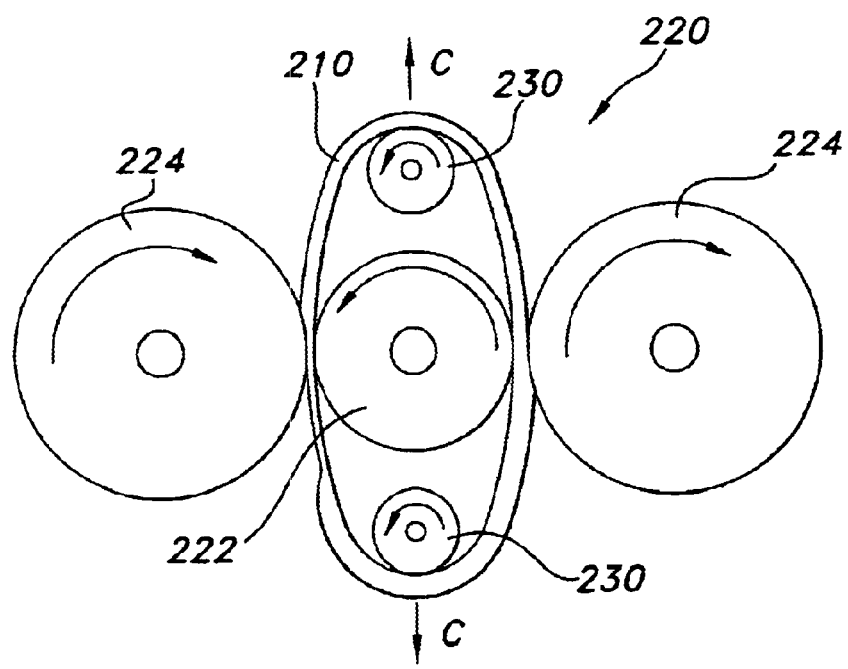
FIG. 5 is a schematic representation of the further embodiment of the method and apparatus of the present invention.

Referring specifically to FIGS. 4 and 5, further embodiments of the roller apparatus of the present invention are shown. The present invention contemplates using one or more tensioning rollers in combination with the inner or luminal roller in order to maintain outward radial tension on the green tube as it is being circumferentially thinned between the rollers to eliminate pinching.

Referring specifically to FIG. 4, where like reference numerals denote like structures, apparatus 120 includes rollers 122 and 124 of the type described above. Roller 122 is the inner or luminal roller and 124 is the outer or external roller. Rotation of roller 122 effects counter rotation of roller 124. The green tube 110 is positioned so as to be circumferentially compressed between the counter rotating rollers 122 and 124. As mentioned above, during this thinning process not only is the wall thickness of the green tube reduced but the diameter of the tube is increased resulting in a larger tube. As the tube is being thinned, there may be a tendency for the slack created by the increasing diameter of the tube to be caught between the rollers. The embodiment of the present invention, shown in FIG. 4, employs a tensioning roller 130 which may be maintained in outward spring bias relationship with roller 122. The green tube 110 is placed over both roller 122 and adjacent tensioning roller 130. The tensioning roller 130 provides an outward radial tension within the lumen of tube 110 so as to "take up" slack created by the thinning process. Tensioning roller 130 may be spring biased outwardly in the direction of arrow B away from roller 122 to maintain such outward radial tension on tube 110. The tensioning roller 130 may also facilitate circumferential stretching.

A further embodiment of the present invention is shown in FIG. 5 where again like reference numerals denote like structures. Roller apparatus 220 of FIG. 5 includes a pair of exterior rollers 224 positioned on diametrically opposite sides of interior roller 222. As may be appreciated, the exterior rollers 224 compress green tube 210 at two locations on preferably diametrically opposite sides of interior roller 222. Rotation of interior roller 222 effects similar mutual counter rotation of both exterior rollers 224 so as to circumferentially compress green tube 210 therebetween.

In the embodiment shown in FIG. 5, a pair of tensioning rollers 230 are employed in a manner similar to that described above with respect to FIG. 4. The green tube 210 is positioned about roller 222 and adjacent tensioning rollers 230. Two tensioning rollers 230 are positioned in apparatus 220 where an oppositely directed outward spring bias is maintained with respect to inner roller 222. Such outward spring bias causes the tensioning rollers 230 to move in a direction of arrow C shown in FIG. 5. The two tensioning rollers, which are positioned at diametrically opposite ends of roller 222, maintain outward radial tension on the green tube 210 throughout the thinning process so as to take up any slack which may be created during the thinning process.

Figure 7:
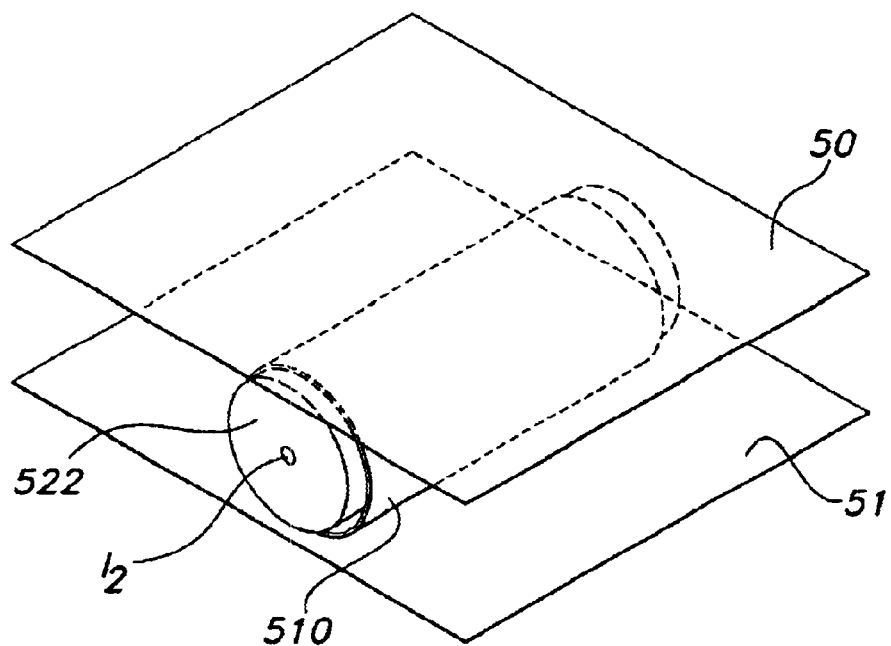
FIG. 7 is a schematic representation of an additional embodiment of the method and apparatus of the present invention utilizing opposing rolling surfaces.

In the embodiment shown in FIG. 7, a pair of smooth, flat surfaces are utilized to compress the tube about a roller. The green tube 510 is positioned about luminal roller 522 and adjacent spaced-apart flat surfaces 50 and 51. The compression and rotation is provided by sliding surface 50 in a direction perpendicular to the axis of roller 522 indicated $l_2$. The compressive force and movement of flat surface 50 causes the luminal roller 522 to rotate and the tube 510 to contact the surface 51 substantially opposite and parallel to surface 50 and further compress the tube.

Figure 8:
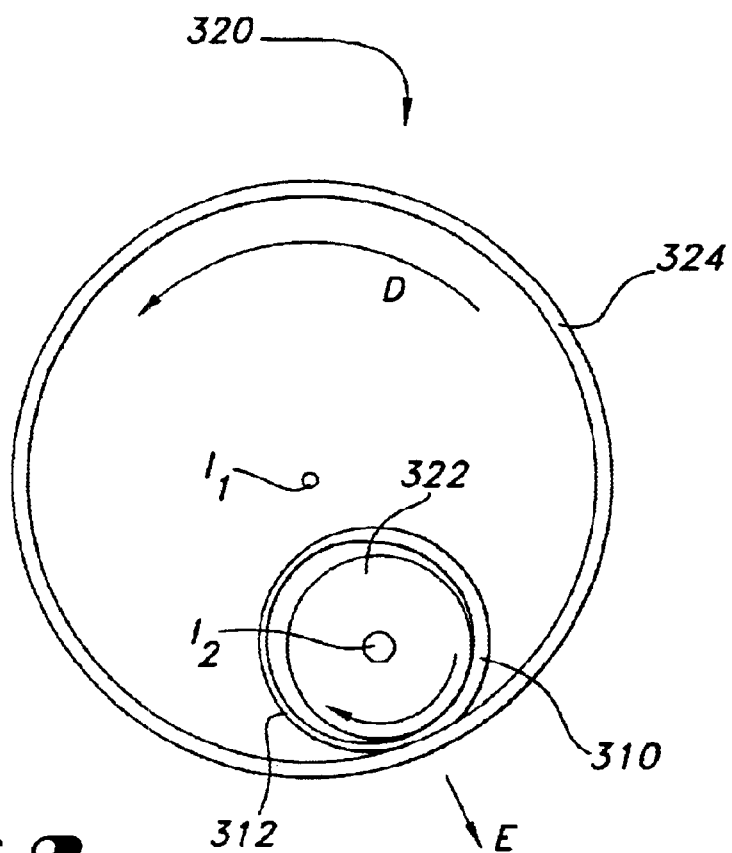
FIG. 8 is an end view of an embodiment of the present invention utilizing a first roller within a second roller.

A further embodiment of the present invention is shown in FIG. 8 where again like reference numerals denote like structures. Roller apparatus 320 of FIG. 8 includes an interior luminal roller 322 positioned within a hollow cylindrical roller 324. In this configuration, the tube 310 is mounted on the luminal roller 322. The roller 322 is held in tension with the roller 324 thereby providing an outwardly directed compressive force. Where hollow cylinder 324 is in a fixed position and not rotatably mounted, the outwardly directed compressive force creates a tread-like friction between the components providing for a circumferential movement of the luminal roller 322 about the inner circumference of the hollow cylinder 324 in the direction of arrow D thereby providing for thinning of the tube.

Where the luminal roller 322 is mounted on an axis $l_2$ and is free to rotate, and where hollow roller 324 is rotatably mounted on axis $l_1$, a compressive force is provided in the direction of arrow E, and the rotational force acts as a cog through the frictional engagement of the tube 310 to rotate the hollow cylinder 324 about axis $l_2$ providing for thinning of the tube.

While the present invention has been described specifically with respect to thinning the wall of an extruded PTFE green tube, it is not limited thereto. The present invention may be used to effect the wall reduction of any resilient tubular member where the tubular wall is subject to reduction from compression.

Furthermore, compression of the tube to reduce the wall thickness is preferably achieved by placement of a portion of the tube between two compressing surfaces. Other techniques for thinning the tube where the material is thinned by an application of force directly to the material is also within the contemplation of the present invention.

Various other changes and modifications may be effected therein by one skilled in the art without departing from the scope or spirit of the invention, and it is intended to claim all such changes and modifications as fall within the scope of the invention.

What is claimed:

1. A method of forming a thinned-wall polytetrafluoroethylene (PTFE) tube comprising the steps of:

providing a PTFE tube having an inner tubular wall surface and opposed outer tubular wall surface defining a tubular wall of a first wall thickness;

positioning said PTFE tube over a first elongate luminal roller having a first surface in contact with said inner tubular wall surface;

positioning a second elongate roller against said outer tubular wall surface; and counter rotating said first and second rollers to compress said tubular wall between said first and second rollers to reduce said tubular wall first thickness to a lesser second thickness;

wherein said PTFE positioning step further includes positioning said PTFE tube over said first luminal roller and over a tensioning roller, said tensioning roller being moveable away from said first luminal roller to maintain said PTFE tube in outward radial tension.

2. A method of claim 1 wherein said PTFE positioning step further includes positioning said PTFE tube over said first luminal roller and over a pair of tensioning rollers, said pair of tensioning rollers being positioned about opposite extents of said first roller, said pair of tensioning rollers being oppositely moveable away from said first roller to maintain said tube in outward radial tension.

3. A method of claim 1 wherein said counter rotating step is achieved in a water bath.

4. A method of claim 1 further comprising the step of increasing the diameter of said tube.

5. A method of claim 1 wherein said substantially flat surface second luminal roller is movably positioned relative to said first luminal roller.

6. A method of forming a thin wall expanded polytetrafluoroethylene (ePTFE) prosthetic tube comprising the steps of:

forming a PTFE green tube having a tubular wall of a given wall thickness;

positioning said PTFE green tube over an inner mandrel;

positioning an outer mandrel against said inner mandrel with said tubular wall therebetween;

effecting counter rotation of said inner mandrel and said outer mandrel to circumferentially compress said tubular wall therebetween so as to reduce said given wall thickness of said PTFE green tube; and expanding said reduced wall-thickness green PTFE tube to form said thinned-wall ePTFE tube.

7. A method of claim 6 extruding said PTFE green tube from a PTFE paste including a lubricant.

8. A method of claim 7 further including the step of drying said reduced wall PTFE green tube to remove said lubricant.

9. A method of claim 8 wherein said expanding step includes uniaxially heat expanding said reduced-wall thickness PTFE green tube.

10. A method of claim 9 further including the step of sintering said expanded reduced wall-thickness PTFE green tube.

11. A method of forming a thin wall polymer tube comprising the steps of:

providing a polymer tube having a tubular wall of a given wall thickness;

positioning said tube over a luminal mandrel;

positioning said luminal mandrel against a smooth surface with said tubular wall therebetween; and effecting rotation of said inner mandrel against and said smooth surface to circumferentially compress said tubular wall therebetween so as to reduce said given wall thickness of said tube.

* * * * *

UNITED STATES PATENT AND TRADEMARK OFFICE
CERTIFICATE OF CORRECTION

PATENT NO.    : 6,638,468 B1
DATED         : October 28, 2003
INVENTOR(S)   : Hill et al.

It is certified that error appears in the above-identified patent and that said Letters Patent is hereby corrected as shown below:

Column 4,
Line 26, delete "...will cause a corresponding increase the inner…" and insert
-- will cause a corresponding increase in the inner --.
Line 62, delete "...movement of one the roller 40…" and insert -- movement of the roller 40 --.

Column 7,
Lines 8-9, delete ...wherein said substantially flat surface second luminal roller is…"
and insert -- wherein said second luminal roller is --.

Signed and Sealed this

Twenty-third Day of March, 2004

JON W. DUDAS
*Acting Director of the United States Patent and Trademark Office*